United States Patent
Zhu (10) Patent No.: US 8,325,741 B2
(45) Date of Patent: Dec. 4, 2012

(54) METHOD, SYSTEM AND DEVICE FOR IMPLEMENTING NETWORK ADDRESS TRANSLATION TRAVERSAL

(75) Inventor: Ning Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 718 days.

(21) Appl. No.: 12/501,266

(22) Filed: Jul. 10, 2009

(65) Prior Publication Data

US 2009/0274146 A1 Nov. 5, 2009

Related U.S. Application Data

(63) Continuation of application No. PCT/CN2008/070348, filed on Feb. 22, 2008.

(30) Foreign Application Priority Data

Mar. 1, 2007 (CN) .......................... 2007 1 0005607

(51) Int. Cl.
*H04L 12/28* (2006.01)
(52) U.S. Cl. ....................................... 370/401
(58) Field of Classification Search ........................ None
See application file for complete search history.

(56) References Cited

U.S. PATENT DOCUMENTS

| | | | | |
|---|---|---|---|---|
| 7,620,033 B2 * | 11/2009 | Chu et al. | ........................ | 370/352 |
| 7,624,417 B2 * | 11/2009 | Dua | ........................ | 725/114 |
| 7,788,383 B2 * | 8/2010 | Andreasen | ........................ | 709/227 |
| 7,941,551 B2 * | 5/2011 | Anantharaman et al. | ..... | 709/228 |
| 8,040,800 B2 * | 10/2011 | Froment et al. | ........................ | 370/230 |
| 8,082,324 B2 * | 12/2011 | Lin et al. | ........................ | 709/218 |
| 8,107,464 B2 * | 1/2012 | Schmidt et al. | ........................ | 370/352 |
| 2003/0009337 A1 * | 1/2003 | Rupsis | ........................ | 704/260 |
| 2005/0259637 A1 * | 11/2005 | Chu et al. | ........................ | 370/352 |
| 2006/0153210 A1 * | 7/2006 | Su | ........................ | 370/401 |
| 2007/0019619 A1 * | 1/2007 | Foster et al. | ........................ | 370/352 |
| 2007/0043829 A1 * | 2/2007 | Dua | ........................ | 709/219 |
| 2007/0076729 A1 * | 4/2007 | Takeda | ........................ | 370/401 |
| 2008/0037430 A1 * | 2/2008 | Wah et al. | ........................ | 370/241 |

(Continued)

FOREIGN PATENT DOCUMENTS

CN 1606304 4/2005

(Continued)

OTHER PUBLICATIONS

Written Opinion of the International Searching Authority issued in corresponding PCT Patent Application No. PCT/CN2008/070348, mailed Jun. 5, 2008.

(Continued)

*Primary Examiner* — Otis L Thompson, Jr.
(74) *Attorney, Agent, or Firm* — Brinks Hofer Gilson & Lione (57) ABSTRACT

A method for implementing NAT traversal is disclosed herein. The first MGW and the ICE mechanism supporting device obtain the local candidate information and the candidate information of the peer end; the first MGW and the ICE mechanism supporting device perform connectivity check according to the candidate information; and the first MGW and the ICE mechanism supporting device transmit media streams according to the result of the connectivity check. A system and a device for implementing NAT traversal are also disclosed. The method, the system and the device under the present disclosure improve stability of transmitting media streams in a network inclusive of an MGC and an MGW (for example, an NGN).

11 Claims, 4 Drawing Sheets

U.S. PATENT DOCUMENTS

| | | | |
|---|---|---|---|
| 2008/0080568 A1* | 4/2008 | Hughes et al. | 370/519 |
| 2008/0159313 A1* | 7/2008 | Rasanen | 370/401 |
| 2008/0186952 A1* | 8/2008 | Lin et al. | 370/352 |
| 2008/0304419 A1* | 12/2008 | Cooper et al. | 370/248 |
| 2010/0027418 A1* | 2/2010 | Rodrig | 370/235 |
| 2010/0064172 A1* | 3/2010 | George et al. | 714/15 |
| 2010/0100630 A1* | 4/2010 | Jiang | 709/228 |
| 2010/0205653 A1* | 8/2010 | Eronen et al. | 726/3 |
| 2010/0293297 A1* | 11/2010 | Perumal et al. | 709/245 |
| 2011/0145397 A1* | 6/2011 | Burns et al. | 709/224 |
| 2011/0289221 A1* | 11/2011 | Lowekamp | 709/227 |

FOREIGN PATENT DOCUMENTS

| | | |
|---|---|---|
| CN | 1848802 A | 10/2006 |
| CN | 101257433 B | 9/2011 |

OTHER PUBLICATIONS

Liu, Yang, et al., Integrated SIPNAT Solving Scheme Design Based on ICE Mode and Realization, Mimo-Micro Systems, May 2006, p. 825-827, vol. 27, No. 5.

Office Action issued in corresponding Chinese Patent Application No. 200710005607.9, mailed Dec. 11, 2009.

Extended European Search Report issued in corresponding European Patent Application No. 08715085.0, mailed Feb. 22, 2010.

Rosenberg, "Interactive Connectivity Establishment (ICE): A Methodology for Network Address Translator (NAT) Traversal for Offer/Answer Protocols" Internet Draft, The Internet Society. Jan. 16, 2007.

International Packet Communications Consortium, "Reference Architecture" V1.2, Jun. 2002. XP-002566645.

* cited by examiner

METHOD, SYSTEM AND DEVICE FOR IMPLEMENTING NETWORK ADDRESS TRANSLATION TRAVERSAL

CROSS-REFERENCE TO RELATED APPLICATIONS

This application is a continuation of International Application No. PCT/CN2008/070348, filed on Feb. 22, 2008, which claims the benefit of Chinese Patent Application No. 200710005607.9, filed on Mar. 1, 2007, both of which are hereby incorporated by reference in their entireties.

FIELD OF THE TECHNOLOGY

The present disclosure relates to the Next-Generation Network (NGN) technology, and in particular, to a method, a system, and a device for implementing Network Address Translation (NAT) traversal in an NGN.

BACKGROUND

The NGN comes forth as a result of convergence of a Time Division Multiplex (TDM)-based Public Switched Telephone Network (PSTN) and an Internet Protocol (IP)-based or Asynchronous Transfer Mode (ATM)-based packet network. The NGN makes it possible to implement integrated services such as voice, video and data on the same network, and ushers in a new era of the next-generation telecom network.

Figure 1:
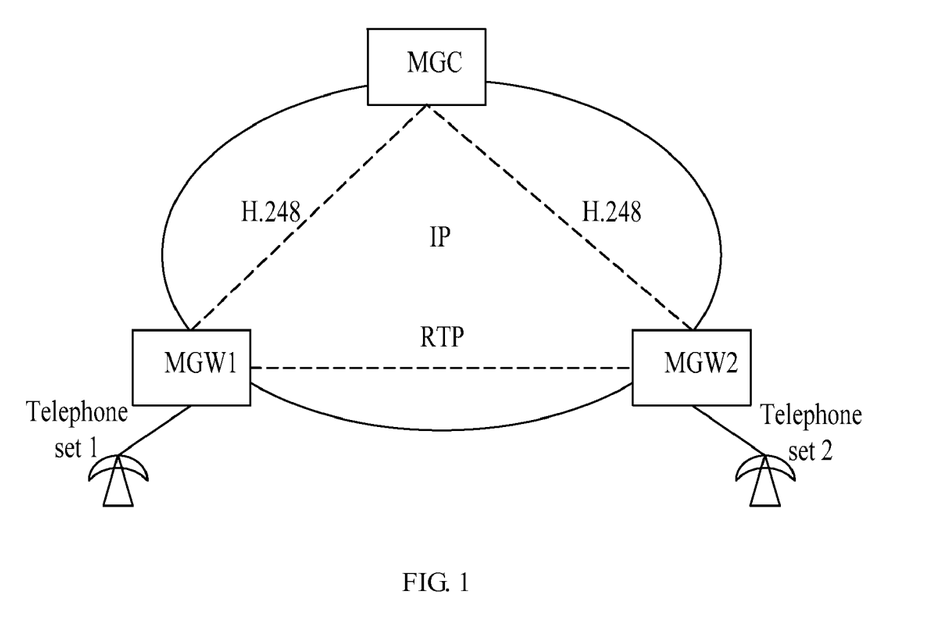
FIG. 1 shows a structure of an NGN in the prior art.

FIG. 1 shows architecture of an existing NGN in the prior art. As shown in FIG. 1, the NGN includes a Media Gateway (MGW) and a Media Gateway Controller (MGC). The MGC is adapted to manage call states and control the MGW bearer resources. The MGW is adapted to convert the media stream type from one format to another format, for example, from an E1 timeslot in a Circuit-Switched (CS) network to a Real time Transport Protocol (RTP) media stream in an IP network, and implement setup, modification and release of media streams and resource management under the signaling control of the MGC.

As shown in FIG. 1, if the bearer network that carries MGW1 and the bearer network that carries MGW2 are the same private network or public network, the IP packet can be sent from MGW1 to MGW2 directly and vice versa. However, if the bearer network that carries MGW1 is different from the bearer network that carries MGW2, for example, MGW1 is in a public network but MGW2 is in a private network, or MGW1 and MGW2 are in two different private networks between which IP packets cannot be exchanged directly, the media stream may be unidirectional or blocked. The same problem may also exist in the case that one side of the media stream is a MGW and the other side is a Session Initiation Protocol (SIP) terminal, or H323 terminal, or CS domain network terminal, or a Packet-Switched (PS) domain network terminal.

In the prior art, in order to transmit the IP packet between the private network and the public network, the network address/port translation technology is generally applied. Network Address Translation (NAT) is a standard technology for mapping one address field such as an Intranet to another address field such as Internet. The NAT allows a terminal in an Intranet exclusively used within an organization (namely, a private network) to be connected to a terminal in a public domain (namely, public network), and the internal terminal does not need to have a registered Internet address.

In the NAT traversal technology that derives from the NAT technology, the terminal on a private network has a private IP address and accesses the public network through a Network Address Translator (NAT)/Fire Wall (FW) at the egress. Two common NAT traversal modes available currently are: Simple Traversal of UDP Through Network Address Translators (STUN) mode of the User Datagram Protocol (UDP), and Traversal Using Relay NAT (TURN) mode.

The process of implementing the STUN mode is: Through a UDP, the STUN client sends a request STUN message to the STUN server outside the NAT. After receiving the request message, the STUN server generates a response message. The response message carries information about the source port of sending the request message, namely, the corresponding external interface of the STUN CLIENT on the NAT. Through the NAT, the STUN server sends the response message to the STUN client. Through the response message, the STUN client knows the external address of the NAT, and fills the external address into the UDP load of the call protocol, telling the receiver that the RTP receiving address and the port ID of the local side are the external address and the port ID of the NAT. Because the NAT mapping table entries of the media stream are already set up on the NAT through the STUN protocol beforehand, the media stream can traverse the NAT smoothly.

The implementation method of the TURN mode is similar to the implementation method of the STUN mode. In the private network, the Voice over IP (VoIP) terminal knows the service address of the public network beforehand, and fills the service address into the IP packet payload, namely, the address information of the signaling.

In the prior art, the NGN implements the NAT traversal in the following way:

In the private network, the address of the RTP endpoint (RTP1) in the local Session Description Protocol (SDP) is reported by MGW1 in the private network to the MGC at the time of capability negotiation, and this address is a private network address. It is assumed that the address is the address of Customer Premises Equipment (CPE) 2. In the H.248 message sent by the MGC to MGW2 in the public network, the remote address of the RTP endpoint (RTP2) of the MGW2 is specified to be the address of CPE2. In this way, according to the H.248 protocol, RTP2 sends the media stream to the address of CPE2 when sending the media stream to the MGW1 subsequently. However, CPE2 is a private network address, which is unreachable by the media stream that comes from RTP2. Therefore, when the media stream sent from the endpoint RTP1 passes through the NAT, the NAT converts the address of the media stream from CPE2 to CPE1, and a packet signal that carries the CPE1 address information is added into the H.248.37. The packet signal is delivered to RTP2, instructing RTP2 to perform NAT traversal. The RTP2 replaces the received address (CPE1 address) with the old remote private network address (CPE2 address), and sends the subsequent media stream to CPE1. According to the preset address mapping relation, the NAT sends the media stream received by CPE1 to the private network address (CPE2 address) of MGW1.

The defects of the foregoing method are: The NAT traversal defined in the H.248.37 requires the endpoint in the private network to send the media stream to the endpoint in the public network first so that the NAT is triggered to generate address mapping; the endpoint on the public network uses the received media stream source address as a destination address of sending the media stream. In many circumstances, however, the network bears only unidirectional media streams such as ring back tone and color ring back tone to be played by the peer end. Because the called party has not gone off-hook at this time, no media stream is sent from the calling party in the private network. Besides, when the silence detection is activated, if the user in the private network is silent, no media stream is sent from the private network to the public network; and the public network is unable to send the media stream to the private network. That is, as defined by the H.248.37, the endpoint in the private network needs to send the media stream to the IP endpoint on the public network first. Otherwise, the interworking of the media stream is impossible, thus affecting transmission stability of media streams in the NGN.

SUMMARY

A method for implementing NAT traversal is disclosed in an embodiment of the present disclosure to improve transmission stability of media streams.

A system for implementing NAT traversal is disclosed in an embodiment of the present disclosure to improve transmission stability of media streams.

A device for implementing NAT traversal is disclosed in an embodiment of the present disclosure to improve transmission stability of media streams.

The technical solution under the present disclosure is implemented in the following way:

A method for implementing NAT traversal is disclosed. The method includes:

obtaining, by a first MGW, information about a local candidate and a peer end candidate of an Interactive Connectivity Establishment (ICE) mechanism supporting device, and sending the information about the local candidate to the ICE mechanism supporting device;

performing connectivity check with the ICE mechanism supporting device according to the candidate information; and transmitting media streams to and from the ICE mechanism supporting device according to a result of the connectivity check.

A system for implementing NAT traversal is disclosed. The system includes:

a first MGW, adapted to: obtain information about a local candidate and a peer end candidate of an ICE mechanism supporting device, perform connectivity check with the ICE mechanism supporting device according to the candidate information, and transmit media streams to and from the ICE mechanism supporting device according to a result of the connectivity check; and an ICE mechanism supporting device, adapted to: obtain information about a local candidate and a peer end candidate of the first MGW, perform connectivity check with the first MGW according to the candidate information, and transmit media streams to and from the first MGW according to a result of the connectivity check.

A device for implementing NAT traversal is disclosed. The device includes:

an obtaining unit, adapted to: obtain information about a local candidate and a peer end candidate of an ICE mechanism supporting device, and send the information about the local candidate to the ICE mechanism supporting device;

a connectivity check unit, adapted to perform connectivity check with the ICE mechanism supporting device according to the candidate information; and a transmitting unit, adapted to transmit media streams to and from the ICE mechanism supporting device according to a result of the connectivity check.

A device for implementing NAT traversal is disclosed. The device includes:

a control unit, adapted to control the first MGW to obtain information about a local candidate; and a first sending unit, adapted to: perform signaling interaction with the ICE mechanism supporting device to obtain information about the candidate of the ICE mechanism supporting device, send the candidate information to the first MGW, and send information about the candidate of the first MGW to the ICE mechanism supporting device.

Through the technical solution under the present disclosure, the MGW and the ICE mechanism supporting device in the network perform connectivity check according to candidate information obtained from each other, and perform NAT traversal according to the result of the connectivity check. As against the prior art, the technical solution under the present disclosure does not require an endpoint in the private network to send a media stream to the NAT beforehand in order to trigger the NAT to generate a mapping address, but accomplishes NAT traversal in the case that both sides of the media stream are in the private network. Moreover, the MGW not only enables the media stream between the MGW and another MGW that supports the functions of the present disclosure to traverse the NAT, but also enables the media stream between the MGW and any other device that supports the ICE mechanism to traverse the NAT, thus improving stability of transmitting the media streams in a network inclusive of an MGC and an MGW (for example, an NGN).

BRIEF DESCRIPTION OF THE DRAWINGS

In order to make the merits of the present disclosure clearer to those skilled in the art, the exemplary embodiments of the present disclosure are hereinafter described in detail by reference to accompanying drawings.

DETAILED DESCRIPTION

In order to make the technical solution, objectives and merits of the present disclosure clearer, the disclosure is detailed below by reference to accompanying drawings and preferred embodiments.

In the NAT traversal in the prior art, the transmission stability of media streams is not ensured. A new NAT traversal mode is disclosed in an embodiment of the present disclosure to improve transmission stability of the media streams in a network inclusive of an MGC and an MGW (for example, an NGN).

An ICE mechanism is applied in an embodiment of the present disclosure to handle the SIP-based NAT traversal. The method for implementing the mechanism includes:

integrating the NAT traversal modes such as STUN and TURN, generating a candidate list in the STUN or TURN mode at the receiver side and the transmitter side of the media stream respectively, and performing cross pairing for the candidate list at both sides to generate a series of candidate pairs, where each candidate pair includes a local candidate and a remote candidate; and performing connectivity check and concluding ICE for each candidate pair respectively, selecting the candidate pair of the highest priority among all the candidate pairs that pass the connectivity check successfully, and using the selected candidate pair as a channel for receiving and transmitting media streams at the receiver side and the transmitter side.

The implementation process of the ICE mechanism is detailed below: It is assumed that a SIP terminal at the calling side allocates a host address to a media stream and the allocated host address is assumed as ho; before sending an offer message, the ho obtains a mapping public network address through the STUN mode, and this address is called a server reflexive address in the ICE mechanism which is assumed as sro; and, the ho obtains a public network address through the TURN mode, and this address is called a relay address in the ICE mechanism which is assumed as ro. In this way, three candidates are obtained at the calling side: a host candidate, a server reflexive candidate, and a relayed candidate. The addresses of the three candidates are ho, sro, and ro respectively. The IP version of the addresses mentioned above may be IP V4 or IP V6. After obtaining the three candidates, the calling terminal sends the three candidates to the called terminal through an offer message. After receiving the three candidates from the peer end, the called terminal obtains its own candidate information in the same way. It is assumed that the called terminal obtains three candidates: host candidate, server reflexive candidate, and relayed candidate of the called terminal, and the three candidates correspond to three addresses: ha, sra, and ra, respectively. Through an answer message, the called terminal sends the three candidates to the calling terminal. The candidates at the both sides are cross-combined to form nine candidate pairs (actually there may be less candidate pairs in a practical scenario, for example, when only two candidates exist at the calling side and only one candidate exists at the called side). Each candidate pair may form an effective media stream channel. Through a connectivity check mechanism, the calling terminal and the called terminal test the nine candidate pairs in priority order. The specific test mode is: The calling terminal sends a STUN binding request message to the called terminal; after receiving the STUN binding request message, the called terminal returns an answer message to the calling terminal; for the same candidate pair, the called terminal sends a STUN binding request message to the calling terminal, and the calling terminal returns an answer message as well. In this way, a connectivity check process is completed for a candidate pair. This process involves two request messages and two answer messages, and may be called briefly as a 4-message handshake mechanism. After the candidate pair that has the highest priority and has passed the connectivity check is selected, the calling terminal and the called terminal can receive and transmit the media stream according to the IP address and the port represented by the candidate pair.

In this embodiment, in order to solve the problems involved in the NAT traversal in a network inclusive of an MGC and an MGW (for example, NGN) in the prior art, the ICE mechanism is introduced into the functions of the MGC and the MGW. The implementation method is: The first MGW and the ICE mechanism supporting device (namely, the device that supports the ICE mechanism) obtain the information about the local candidates and the candidates of peer end; the first MGW and the ICE mechanism supporting device perform connectivity check according to the candidate information; and the first MGW and the ICE mechanism supporting device transmit media streams according to the result of the connectivity check.

Figure 2:
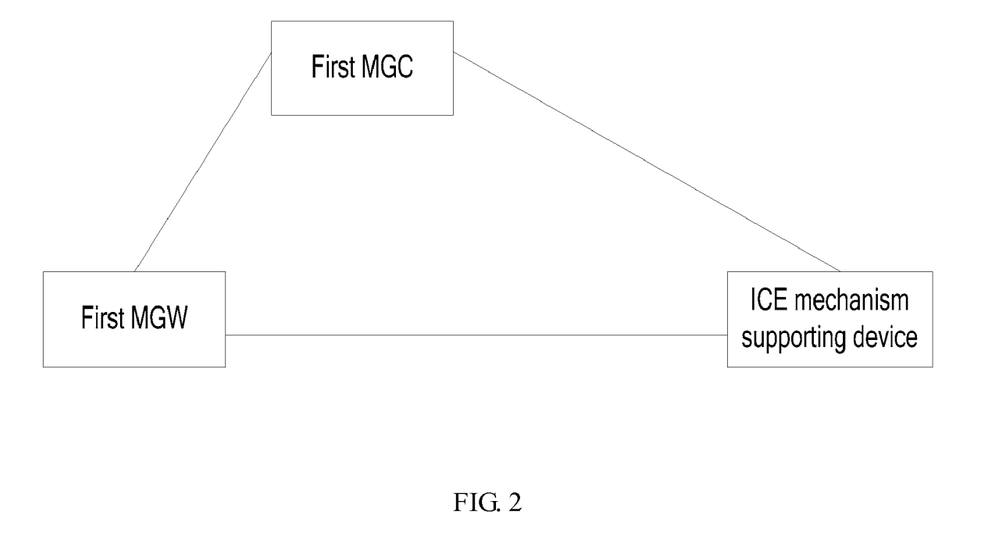
FIG. 2 shows composition of a system in an embodiment of the present disclosure.

FIG. 2 shows composition of a system in an embodiment of the present disclosure based on the foregoing method. As shown in FIG. 2, the composition of the system in the present disclosure includes:

a first MGW, adapted to: obtain information about the local candidate under control of the first MGC, receive information about the candidate of the ICE mechanism supporting device of the peer end from the first MGC, perform connectivity check with the ICE mechanism supporting device of the peer end, report the result of the connectivity check to the first MGC, and transmit media streams according to the result of the connectivity check;

an ICE mechanism supporting device, adapted to: perform signaling interaction with the first MGC, receive the information about the candidate of the first MGC from the first MGW, obtain the local candidate information, send the local candidate information to the first MGC, perform connectivity check with the first MGW, transmit media streams according to the result of the connectivity check, and notify the first MGC when the in-use candidate pair is updated; and a first MGC, adapted to: control the first MGW to obtain the local candidate information, perform signaling interaction with the ICE mechanism supporting device to obtain the information about the candidate of the ICE mechanism supporting device, send the information about the candidate of the ICE mechanism supporting device to the first MGW, send the information about the candidate of the first MGW to the ICE mechanism supporting device, receive the result of the connectivity check from the first MGW, notify the ICE mechanism supporting device when the in-use candidate pair is updated, and receive the message about the update of the in-use candidate pair from the ICE mechanism supporting device.

The first MGC is further adapted to send a message of setting the keep-alive packet type and/or the keep-alive packet sending period to the first MGW. Accordingly, the first MGW is further adapted to: receive the message of setting the keep-alive packet type and/or the keep-alive packet sending period from the first MGC, and send a keep-alive packet to the ICE mechanism supporting device according to the keep-alive packet type and/or the keep-alive packet sending period.

Alternatively, the first MGC is further adapted to send to the first MGW an indication of sending a keep-alive packet. Accordingly, the first MGW is further adapted to: receive the indication of sending a keep-alive packet from the first MGC, and send a keep-alive packet to the ICE mechanism supporting device after receiving the indication.

The ICE mechanism supporting device may be the second MGW controlled by the first MGC, or a combination of the second MGW and the second MGC, or a SIP agent that supports the ICE mechanism, or an IP Multimedia Subsystem (IMS) network that supports the ICE mechanism.

Figure 3:
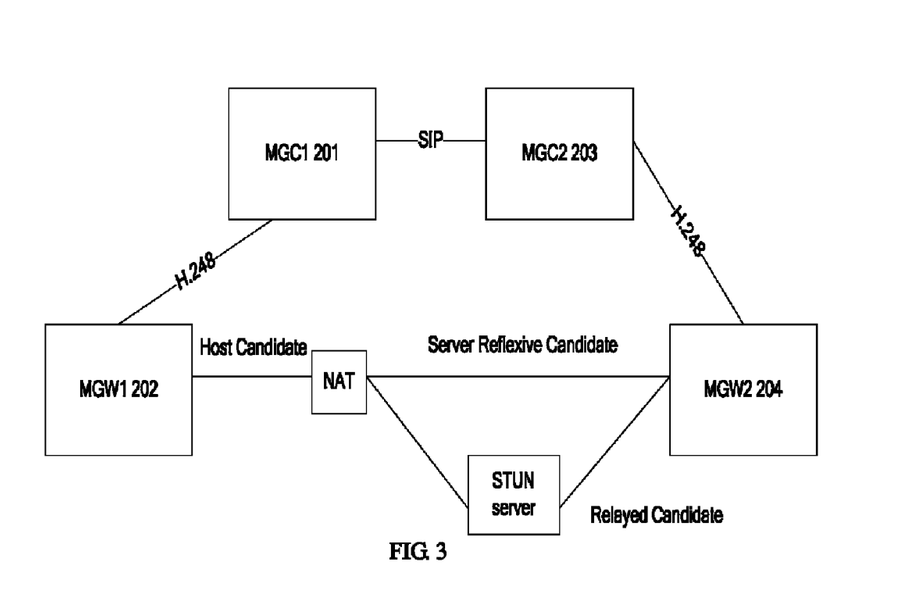
FIG. 3 shows a structure of a system in an embodiment of the present disclosure.

FIG. 3 shows a structure of a system in an embodiment of the present disclosure. In this embodiment, the ICE mechanism supporting device is a combination of the second MGC 203 and the second MGW 204.

The second MGW 204 is adapted to:

receive the information about the candidate of the peer end first MGW 202 from the second MGC 203, receive the indication of gathering candidates from the second MGC 203, obtain the local candidate information in the STUN mode according to the indication of gathering candidates, and send the local candidate information to the second MGC 203;

perform connectivity check with the first MGW 202 according to the local candidate information and the candidate information of the peer end; and transmit media streams to and from the first MGW 202 according to the result of the connectivity check.

The second MGC 203 is adapted to:

receive the information about the candidate of the first MGW 202 from the first MGC 201, send an indication of gathering candidates to the second MGW 204, send the information about the candidate of the second MGW 204 to the first MGC 201, and receive the result of the connectivity check from the second MGW 204.

In practice, the indication of gathering candidates is not required; instead, the candidate information is gathered automatically when the MGW allocates the RTP endpoint in the process of negotiating media capabilities, and is reported. If the result of the connectivity check is inconsistent with the previous in-use candidate, the MGC may update the SDP content of the RTP endpoint on the local MGW through a Modify message, or notify the peer end through an Update Offer message of the SIP. After receiving the Update Offer message from the peer end, the MGC may update the SDP content of the RTP endpoint on the local MGW through a Modify message.

In this embodiment, for ease of description, the first MGC 201 is denoted by MGC1 201, and the first MGW 202 is denoted by MGW1 202; and the second MGC 203 is denoted by MGC2 203, and the second MGW 204 is denoted by MGW2 204. As shown in FIG. 3, supposing that MGW1 202 is located in a private network and MGW2 204 is located in a public network, then the working process of the system is as follows:

A call is initiated at MGW1 202. MGC1 201 sets up an RTP endpoint (RTP1) on MGW1 202 in the process of negotiating media capabilities. MGW1 202 obtains candidate information under control of MGC 1 201, including host candidate information, server reflexive candidate information, and relayed candidate information, and sends the obtained candidate information to the MGC1 201 through an H.248 protocol. Through the SIP protocol, MGC1 201 sends the candidate information to MGC2 203 that controls MGW2 204 in the public network. MGC2 203 further sends the candidate information to MGW2 204. After receiving the candidate information of MGW1 202, MGW2 204 obtains its own candidate information in the same way as MGW1 202. In this embodiment, in the public network, the candidate information of MGW2 204 needs information about only one host candidate. MGW2 204 sends the host candidate information to MGW1 202 through MGC2 203 and MGC1 201. In this way, the MGWs at both sides know the local candidate list and the peer end candidate list. Afterward, the MGW1 202 and the MGW2 204 initiates a connectivity check process automatically or as instructed by their own MGC. For example, upon receiving the candidate information of MGW2 204, MGW1 202 can initiate connectivity check automatically. The specific connectivity check process is the same as that in the prior art, namely, performed according to the ICE mechanism. Here MGC1 201 and MGC2 203 need to indicate whether the corresponding MGW is a controlling role. The controlling role selects the final candidate pair. MGC1 201 and MGC2 203 also need to indicate whether the corresponding MGW is a session originator. This indication information is useful for calculating the priority of the candidate pair. This indication may be an H.248 attribute, or an H.248 signal, or a parameter of an event, or set according to rules. An example of the rules is: If no remote SDP exists at the time of adding an RTP, the MGW is an originator of the call; otherwise, the MGW is an answerer of the call. The connectivity check is completed. According to the event setting performed by MGC1 201 and MGC2 203, MGW1 202 and MGW2 204 report the result of the connectivity check to MGC1 201 and/or MGC2 203. In the subsequent process, MGW1 202 and MGW2 204 can transmit media streams according to the result of the connectivity check. According to the ICE mechanism, if the in-use candidate is different from the candidate selected among the result of the connectivity check, the SDP content needs to be updated.

It is worthy of attention that the ICE mechanism involves a concept of light implementation. The side of light implementation does not need to gather candidates. Such a scenario may be understood as having only one host candidate.

The connection mode and the function of the NAT and the STUN server in this embodiment in FIG. 3 are the same as those in the prior art, and are not repeated here any further. In practice, MGW2 204 and MGW1 202 may be controlled by the same MGC. In this case, the function of MGW2 204 is the same as the function of MGW1 202. That is, MGW2 204 is adapted to: receive the information about the candidate of the peer end first MGW 202 from the first MGC 201, obtain the local candidate information, send the local candidate information to the first MGC 201, and perform connectivity check with the first MGW 202 according to the local candidate information and the candidate information of the peer end.

Figure 4:
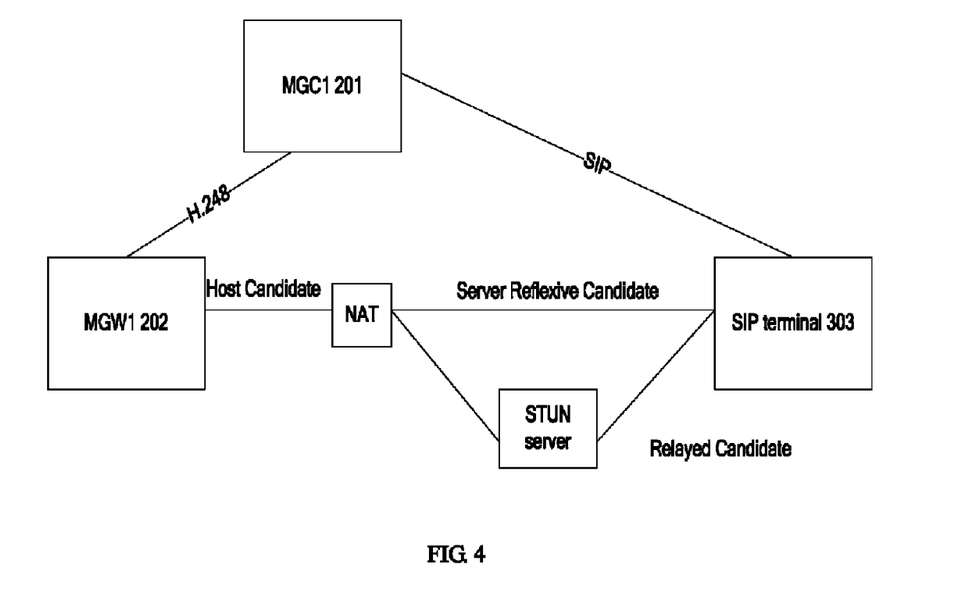
FIG. 4 shows a structure of a system in another embodiment of the present disclosure.

FIG. 4 shows a structure of a system in another embodiment of the present disclosure. As shown in FIG. 4, this embodiment differs from the first embodiment in that: MGW2 204 and MGC2 203 in the first embodiment are replaced by the SIP terminal 303 in this embodiment. The working mode of the system in this embodiment is substantially the same as that in the first embodiment and is not repeated here any further.

Figure 5:
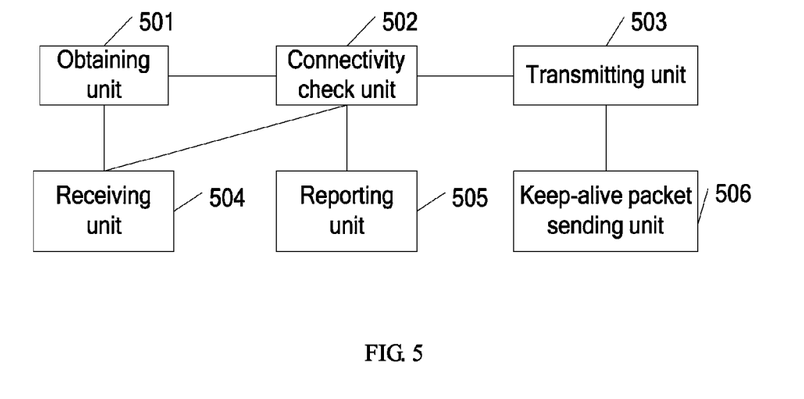
FIG. 5 shows composition of a device in an embodiment of the present disclosure.

FIG. 5 shows composition of a device in an embodiment of the present disclosure based on the foregoing description. As shown in FIG. 5, the device includes:

an obtaining unit 501, adapted to: obtain information about a local candidate and a peer end candidate of an ICE mechanism supporting device, and send the information about the local candidate to the ICE mechanism supporting device;

a connectivity check unit 502, adapted to perform connectivity check with the ICE mechanism supporting device according to the candidate information; and a transmitting unit 503, adapted to transmit media streams to and from the ICE mechanism supporting device according to a result of the connectivity check.

The device further includes a receiving unit 504. The receiving unit 504 is adapted to receive an indication of gathering candidates or an indication of initiating connectivity check from the MGC, and accordingly, the obtaining unit obtains the local candidate information according to the indication of gathering candidates, and the connectivity check unit initiates connectivity check with the ICE mechanism supporting device according to the indication of initiating connectivity check.

The device may further include:

a reporting unit 505, adapted to report the result of the connectivity check to the MGC; and a keep-alive packet sending unit 506, adapted to: receive the message of setting the keep-alive packet type and/or the keep-alive packet sending period from the MGC, and send a keep-alive packet to the ICE mechanism supporting device according to the keep-alive packet type and/or the keep-alive packet sending period; or adapted to: receive from the MGC an indication of sending a keep-alive packet, and send a keep-alive packet to the ICE mechanism supporting device according to the indication.

The MGC may include:

a control unit, adapted to control the first MGW to obtain information about a local candidate; and a first sending unit, adapted to: perform signaling interaction with the ICE mechanism supporting device to obtain information about the candidate of the ICE mechanism supporting device, send the candidate information to the first MGW, and send information about the candidate of the first MGW to the ICE mechanism supporting device.

The MGC may further include:

a second sending unit, adapted to send an indication of gathering candidates to the first MGW to instruct the first MGW to obtain the local candidate information;

a third sending unit, adapted to send an indication of initiating connectivity check to the first MGW;

a fourth sending unit, adapted to: send an indication to the first MGW to indicate whether the first MGW is a controlling role, or send an indication to the first MGW to indicate whether the first MGW is a session originator; and a fifth sending unit, adapted to: send a message of setting the keep-alive packet type and/or the keep-alive packet sending period to the first MGW in order to instruct the first MGW to send a keep-alive packet to the ICE mechanism supporting device according to the keep-alive packet type and/or the keep-alive packet sending period; or adapted to: send to the first MGW an indication of sending a keep-alive packet in order to instruct the first MGW to send a keep-alive packet to the ICE mechanism supporting device according to the indication.

Figure 6:
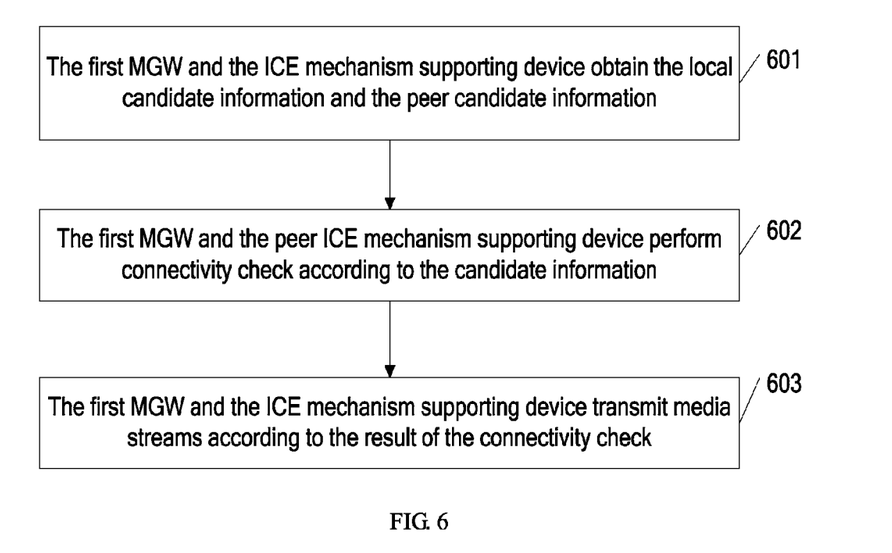
FIG. 6 is a flowchart of a method in an embodiment of the present disclosure.

FIG. 6 is a flowchart of a method in an embodiment of the present disclosure. As shown in FIG. 6, the method includes the following steps:

Step 601: A first MGW and a ICE mechanism supporting device obtain the local candidate information and candidate information of a peer end.

In this step, the first MGW and the ICE mechanism supporting device need to obtain the local candidate information and the candidate information of the peer end in the following way:

The first MGW obtains the local candidate information, and sends the local candidate information to the ICE mechanism supporting device of the peer end through the first MGC; and the ICE mechanism supporting device of the peer end obtains the local candidate information and sends the local candidate information to the first MGW through the first MGC.

Alternatively, the ICE mechanism supporting device of the peer end obtains the local candidate information, and sends the local candidate information to the first MGW through the first MGC; and the first MGW obtains the local candidate information and sends the local candidate information to the ICE mechanism supporting device of the peer end through the first MGC.

This step occurs in the process of negotiating media capabilities at both sides of the session. The foregoing two modes correspond to these two scenarios respectively: The first MGW serves as the session originator (offer), and the first MGW serves as the session answerer. However, due to randomness and complexity of the media capability negotiation process, the execution of this process is sometimes not so strict. For example, after the first MGW obtains the local candidate information and reports it to the first MGC, the first MGC may not notify the information about the candidate of the first MGW to the ICE mechanism supporting device of the peer end (namely, the Offer message carries no SDP), but sends the local candidate information to the peer end after the ICE mechanism supporting device of the peer end sends back an Answer message which carries the candidate information of the peer end through SDP. Therefore, the essence of this step is: At the media capability negotiation stage of the session, both sides gather the local candidate information respectively, and exchange the candidate information with the peer end through signaling such as H.248 or SIP, and the detailed implementation process may be very flexible.

Before the first MGW obtains the local candidate information, the first MGC may send an indication of gathering candidates to the first MGW; accordingly, the first MGW obtains the local candidate information after receiving the indication of gathering candidates. The way of the first MGC sending the indication of gathering candidates to the first MGW is: The first MGC sends the indication of gathering candidates to the first MGW through an extended SDP.

The first MGC and the ICE mechanism supporting device obtain their own candidate information in the same way as the SIP terminal obtaining the candidate information in the ICE mechanism in the prior art.

The foregoing ICE mechanism supporting device may be the second MGW, or a combination of the second MGW and the second MGC, or a SIP agent that supports the ICE mechanism. If the ICE mechanism supporting device is a combination of the second MGW and the second MGC, the ICE mechanism supporting device obtains the local candidate information in the following way: the second MGC receives information about the candidate of the first MGW from the first MGC, sends the information to the second MGW; and the second MGW creates an RTP endpoint, and obtains the local candidate information as indicated by the second MGC. If the ICE mechanism supporting device is a SIP terminal, the ICE mechanism supporting device obtains the local candidate information in the following way: the SIP terminal obtains the local candidate information automatically after receiving the information about the candidate of the first MGW.

The foregoing description is for the exemplary purpose only. In practice, the call process may be initiated by the ICE mechanism supporting device of the peer end rather than the first MGW. Moreover, the first MGW and the ICE mechanism supporting device may obtain the local candidate information before, during or after the obtaining of the candidate information of the peer end, depending on the specific flow.

Step 602: The first MGW and the ICE mechanism supporting device perform connectivity check according to the candidate information.

Upon obtaining the local candidate information and the candidate information of the peer end, the first MGW and the ICE mechanism supporting device can perform connectivity check to determine the candidate pair ultimately for transmitting media streams.

In this step, the first MGW and/or the ICE mechanism supporting device may initiate connectivity check automatically, or initiate connectivity check under control of the first MGC. The detailed connectivity check process on the bearer layer is the same as the connectivity check process in the ICE mechanism in the prior art. Before this step, the first MGC needs to send to the first MGW an indication of initiating connectivity check, and/or indication information that indicates whether the first MGW is a controlling role, and/or indication information that indicates whether the local terminal is a session originator through Extended H.248Protocol. The controlling role indication information indicates whether the first MGW is a controlling role. The controlling role selects the final candidate pair. The session originator indication information indicates that the local terminal calculates the priority of the candidate pair; or the first MGW judges whether the first MGW itself is a session originator according to whether the H.248 message carries a remote SDP in the media negotiation process. If the connectivity check is initiated automatically, the connectivity check process can be initiated after both sides obtain the candidate information.

Upon completion of the connectivity check, the first MGW reports the connectivity check result to the first MGC through an event, or through an answer to the H.248 request message, depending on the event setting on the first MGC. The reporting may be performed after the connectivity check is completed or the connectivity check fails.

Step 603: The first MGW and the ICE mechanism supporting device transmit media streams according to the result of the connectivity check.

In this step, the first MGW and the ICE mechanism supporting device transmit media streams according to the result of the connectivity check obtained in step 602. In practice, for example, in the case of call holding, the first MGW and the ICE mechanism supporting device may receive or transmit media streams discontinuously, namely, it is possible that no media stream is transmitted in the network in a time period. In this case, in order to keep effectiveness of the channel, the first MGW needs to send a keep-alive packet to the ICE mechanism supporting device of the peer end, and may need to answer the keep-alive packet sent from the ICE mechanism supporting device of the peer end. The keep-alive packet may be a STUN binding request message that needs to be answered, or a No-Op packet or silence packet that does not need to be answered. The period of sending the keep-alive packet needs to be less than the time of holding the address mapping on the NAT. The keep-alive packet is transmitted along the media stream path. The first MGC may send a message of setting the keep-alive packet type and/or the keep-alive packet sending period to the first MGW beforehand through an extended H.248; accordingly, the first MGW sends a keep-alive packet to the ICE mechanism supporting device according to the set keep-alive packet type and/or keep-alive packet sending period when necessary. Alternatively, the first MGC sends to the first MGW an indication of sending a keep-alive packet through an extended H.248 protocol; and the first MGW sends a keep-alive packet to the ICE mechanism supporting device after receiving the indication from the first MGC. The indication of sending a keep-alive packet may also carry the keep-alive packet type and/or the keep-alive packet sending period.

The candidate information mentioned in steps 601-603 is host candidate information, server reflexive candidate information, or relayed candidate information, or any combination thereof.

Moreover, a concept of a peer reflexive candidate is put forward. In the connectivity check process, a STUN binding request message is used in the connectivity check. The answer to this message carries a reflexive address (the word "address" herein generally refers to the IP address and the port). If this address is different from the existing local candidate address, the reflexive address is called a peer end reflexive address. This address differs from the server reflexive address in that: The former derives from peer reflectance, and latter derives from the reflectance on the STUN server. For the peer end, if the source address of the STUN binding message received in the connectivity check is different from all existing remote candidates and the connectivity check succeeds, it is determined that the candidate is a peer reflexive remote candidate. If the peer reflexive candidate is selected for transmitting media streams, the address needs to be reported to the MGC for the purpose of access control and other purposes.

Figure 7:
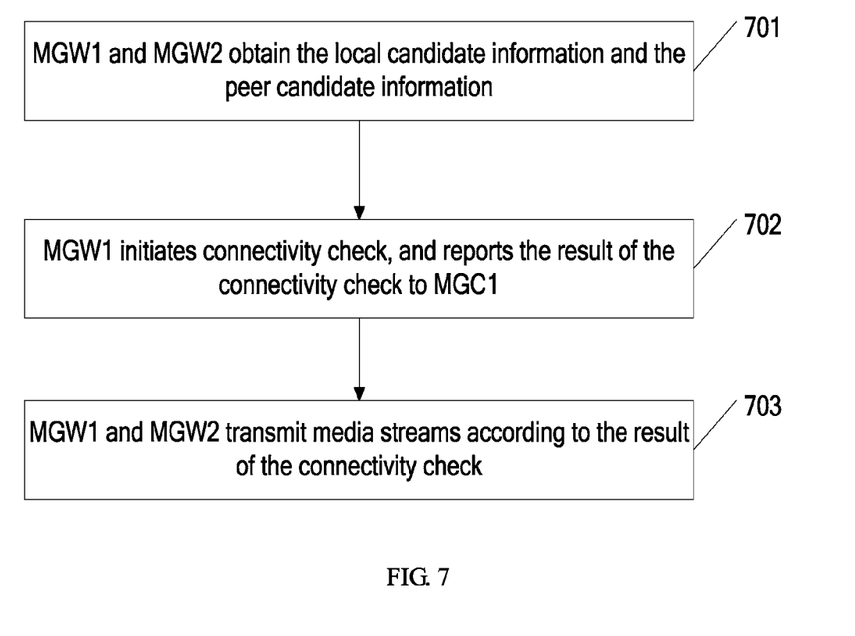
FIG. 7 is a flowchart of a method in another embodiment of the present disclosure.

FIG. 7 is a flowchart of a method in another embodiment of the present disclosure. FIG. 3 shows a system structure of this embodiment, where the ICE mechanism supporting device is a combination of the second MGC and the second MGW. In this embodiment, for ease of description, the first MGC is denoted by MGC1, the first MGW is denoted by MGW1, the second MGC is denoted by MGC2, and the second MGW is denoted by MGW2. The method in this embodiment includes the following steps:

Step 701: MGW1 and MGC2 obtain the local candidate information and the candidate information of the peer end.

A call is initiated at MGC1. In the process of negotiating media capabilities, an RTP endpoint (RTP1) is set up. This RTP endpoint has a local network interface address (ho). The ho may be an IPV4 address together with a port, or an IPV6 address together with a port. In this embodiment, it is assumed that the ho is an IPV4 address together with a port. Through the STUN server, MGW1 obtains server reflexive candidate information (sro) and relayed candidate information (ro). In the process of negotiating media streams, MGC1 uses an extended SDP to instruct MGW1 to obtain the foregoing candidate information; accordingly, MGW1 uses the extended SDP to report the candidate information to MGC1. For example, if the current MGC1 requires MGW1 to report the server reflexive candidate, the SDP sent by MGC1 to MGW1 is expressed by the following "a=" line:

a=candidate: 2 1 UDP 1694498562 $ $ typ srflx raddr $ rport $, where:

the first two "$" symbols indicate the server reflexive address and the port that need to be reported by MGW1;

the last two "$" symbols indicate the host address and the port that need to be reported by MGW1;

"a=candidate" means the agent attribute of the action;

"UDP" means that the UDP protocol is in use;

"typ srflx" means that the candidate is a server reflexive candidate;

"raddr" refers to the "related" address that needs to be filled by MGW1; and

"rport" refers to the port that needs to be filled by MGW1.

Accordingly, MGW1 fills the obtained server reflexive candidate address and port into the corresponding position of the SDP at the time of answering, as shown below:

a=candidate: 2 1 UDP 1694498562 192.0.2.3 45664 typ srflx raddr 10.0.1.1 rport 8998;

or, a=candidate:? ? ? ? ? ? srflx, thus requiring the MGW to gather and report the server reflexive candidate information;

or, a=candidate:? ? ? ? ? ? *, thus requiring the MGW to gather and report different types of candidate information.

Anyway, the specific extending mode is not unique.

MGC1 obtains three candidates of MGW1, and may select one of the candidates and set the selected candidate into the m/c line of the SDP as an in-use candidate. In the subsequent step 702, if the candidate information obtained in the connectivity check is inconsistent with the candidate information stored in the in-use candidate, MGC1 may substitute the candidate information obtained through the connectivity check for the candidate information in the in-use candidate in the m/c line. MGC1 sends the obtained three candidates to MGC2 through SIP signaling, and MGC2 forwards them to MGW2. Like MGW1, MGW2 has an RTP endpoint (RTP2) and obtains the candidate information. Because MGW2 is in the public network, only one candidate is required, namely, host candidate information "ha", and the host candidate information is sent to MGW1 through MGC2 and MGC1. In this way, both MGW1 and MGW2 know the local candidate information and the candidate information of the peer end, namely, candidate list; and three candidate pairs are generated, namely, (ho, ha), (sro, ha), and (ro, ha).

Step 702: MGW1 initiates connectivity check, and reports the result of the connectivity check to MGC1.

In this embodiment, through an extended H.248 protocol, MGC1 instructs MGW1 to initiate connectivity check, and indicates whether MGW1 is a controlling role and indicates whether MGW1 is a session originator. The extended H.248 protocol may be obtained by defining a new ostuncc packet on the basis of the H.248 protocol. This ostuncc packet includes:

a signal "scc": This signal instructs MGW1 to initiate connectivity check of the ICE mechanism, and marks the media stream that needs to undergo connectivity check, and may carry an indication parameter, for example, H.248 stream ID, or foundation number and component-id of the ICE mechanism, or any combination thereof. Alternatively, the signal does not carry such parameters, but indicates connectivity check for all media streams within the effect scope of the signal;

attribute "control": This attribute indicates whether MGW1 is a controlling role or a controlled role, and may be put under the Local Control Descriptor. In this embodiment, it is assumed that MGW1 is a controlling role, namely, MGW1 decides the finally selected candidate pair; and attribute "side": This attribute indicates whether MGW1 is an offer side or an answer side. The value of this attribute is used for calculating priority of the candidate pair.

The information carried in the two attributes may be transmitted through parameters of the scc signal.

Connectivity check is performed between MGW1 and MGW2, and the result of the connectivity check is reported to the MGC, the controlling role and the called role. That is, both MGW1 and MGW2 can report the result of the connectivity check. The ICE mechanism stipulates two connectivity check states: running, and completed. The reporting may be performed after the connectivity check is completed or after the connectivity check fails. The result of the connectivity check may be reported through an event, or through an answer to the H.248 request message. The contents reported include any combination of the following items:

current state of each candidate pair, for example, waiting, in-progress, succeeded, failed, or frozen; and selected candidate pair: This candidate pair is used for transmission of the media stream.

If the selected candidate pair includes the peer reflexive candidate, the reflexive type of the peer end (namely, local peer reflectance or remote peer reflectance) needs to be reported, and the IP address and the port of the peer reflectance candidate need to be reported. The IP address and the port are adapted for subsequent processing, for example, access control.

In this embodiment, it is assumed that MGW1 is responsible for reporting the connectivity check result, and MGW1 also needs to extend the H.248 protocol by defining a ccr event in the newly defined ostuncc packet in order to transmit the connectivity check result. This event may be set for reporting the connectivity check results of all media streams on an RTP endpoint, or the connectivity check results of all media streams on the specified streamID on the RTP endpoint. The information carried in the reported event includes: H.248 stream ID, Group ID, local foundation number, foundation number of the peer end, component-id, reflexive type of the peer end (local or remote), peer reflexive IP address and port, local reflexive IP address and port, information about whether the candidate pair is selected, or any combination thereof.

The data type of the "result" parameter of the reported event is a string list in the following format:

StreamID": "groupID": "foundation-L": "foundation-R": "component-id": "state[:ref lexive type of the peer end and address][:selected], where:

streamID is an H.248 stream ID;

groupID is an H.248 group ID;

foundation-L is the local foundation number in the candidate pair;

foundation-R is the foundation number of the peer end in the candidate pair;

component-id is the component-id of the candidate pair, where the local terminal and the peer end terminal use the same component-id;

state is the current state of the candidate pair, and the state values include: waiting, in-progress, succeeded, failed, and frozen;

reflexive type of the peer end and address indicate the type of the peer reflexive candidate, which comes in two types: local peer reflexive candidate, and remote peer reflexive candidate. In a candidate pair, it is possible that the peer reflexive candidate is generated at only one side, or the peer reflexive candidate is generated at both sides. All types of peer reflexive candidates in the candidate pair and the corresponding peer reflexive IP address and port may be reported through the "reflexive type of the peer end and address"; and "selected" indicates whether the candidate pair is selected for transmitting media streams.

The ICE mechanism standard stipulates that: In a candidate pair, two candidate component-ids need to be the same. If the MGC processes the component-id specially, it is necessary to ensure that the component-id does not repeat in different groups and streams. For example, if internal component-id reallocation is performed for the MGW or other means is used to accomplish the same purpose, the MGW does not need to report the streamID or groupID, but may need to report two different component-ids.

If the connectivity check fails, an error code or a null string may be returned to indicate the failure.

In the final implementation solution, the contents of the reported event may include part or all of the contents of the foregoing reported event.

Further, if the reported connectivity check results are sorted, for example, sorted according to priority of the candidate pair before they are reported, the "elected" parameter is not required.

Further still, in order to avoid reported messages that are too long, it is practicable that the candidate pairs in certain states are reported, for example, the candidate pairs that pass or fail the connectivity check, and the candidate pairs not checked are not reported. Parameters may be added into the event setting to accomplish such a purpose.

Step 703: MGW1 and MGW2 transmit media streams according to the result of the connectivity check.

MGC1 and MGC2 update the SDP of MGW1 and MGW2 according to the reported connectivity check result to ensure that the IP address and the port in the m/c line are the candidate IP address and the port of the selected candidate. It is worthy of attention that the foregoing operation may be redundant because MGW1 and MGW2 already obtain the selected candidate pair in the connectivity check process. The operation is described above in order to keep in line with the current ICE mechanism standard.

In this step, if the selected candidate pair lacks for transmission of media streams in a long time, MGW1 sends a keep-alive packet to MGW2 in order to keep the candidate pair effective. For that purpose, MGC1 needs to set the keep-alive packet type and/or the keep-alive packet sending period for MGW1 beforehand through the extended H.248. Afterward, MGW1 sends the keep-alive packet according to the set type and/or period when necessary. Alternatively, MGC1 sends to MGW1 an indication of sending a keep-alive packet, and MGW1 sends a keep-alive packet to MGW2 whenever receiving an indication of sending the keep-alive packet. The time of calculating the keep-alive packet sending period starts from stop of receiving and transmitting media streams. If transmission of media streams goes on all the time, no keep-alive packet needs to be sent. For that purpose, the following contents need to be added into the ostuncc packet:

attribute "kaType": This attribute indicates the keep-alive packet type, for example, No-Op packet, silent packet, and STUN binding request packet; the first two types of packets allow for the NAT keep-alive before the device that does not support STUN/ICE. In this way, the sent information is not limited to the candidate pair information. The keep-alive packet is sent on the media stream transmission path. This attribute may be put under the LocalControlDescriptor; and attribute "Tr": This attribute indicates the keep-alive packet sending period. Different Tr values may be set for different media streams, or the same Tr value is set for all media streams. This attribute may be put under the LocalControlDescriptor.

The keep-alive packet may be sent through a signal. The signal may specify the media stream path on which a keep-alive packet needs to be sent, or indicate that the keep-alive packet is sent on all media stream paths. In this signal, the keep-alive packet type and the Tr attribute may be set through parameters.

In addition, the ostuncc packet may further include an "iuType" attribute, which indicates the in-use candidate type mentioned in step 701. In this embodiment, there are three in-use candidate types: host candidate, server reflexive candidate, and relayed candidate. The three types can be defined into hc(0×0001), src(0×0002) and rc(0×0003). This attribute may also be put under the LocalControlDescriptor. According to the value of this attribute, the MGW puts the IP address and the port of the corresponding candidate type into the m/c line of the SDP.

This embodiment is about the implementation process of the technical solution under the present disclosure when a media stream is exchanged between two MGWs. When the media stream is exchanged between an MGW and another ICE mechanism supporting device, the implementation process is the similar to that in FIG. 7, and is not repeated here any further because it can be easily inferred by those skilled in the art.

Through the technical solution under the present disclosure, the MGW and the ICE mechanism supporting device in the network perform connectivity check according to candidate information obtained from each other, and perform NAT traversal according to the result of the connectivity check. As against the prior art, the technical solution under the present disclosure does not require an endpoint in the private network to send a media stream to the NAT beforehand in order to trigger the NAT to generate a mapping address, but accomplishes NAT traversal in the case that both sides of the media stream are in the private network. Moreover, the MGW not only enables the media stream between the MGW and another MGW that supports the functions of the present disclosure to traverse the NAT, but also enables the media stream between the MGW and any other device that supports the ICE mechanism to traverse the NAT, thus improving stability of transmitting the media streams in a network inclusive of an MGC and an MGW (for example, an NGN).

Although the disclosure has been described through several preferred embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the claims or their equivalents.

What is claimed is:

1. A method for implementing Network Address Translation, NAT, traversal, comprising:
   obtaining, by a first Media Gateway, MGW, information about a local candidate and a candidate of a Interactive Connectivity Establishment, ICE, mechanism supporting device of a peer end, and sending the information about the local candidate to the ICE mechanism supporting device of the peer end;
   performing connectivity check with the ICE mechanism supporting device of the peer end according to the candidate information; and
   transmitting media streams with the ICE mechanism supporting device according to a result of the connectivity check; wherein in transmitting the media streams, the method further comprises:
   receiving, by the first MGW, a message of setting a keep-alive packet type and/or a keep-alive packet sending period sent by a first Media Gateway Controller, MGC, through an extended H.248 protocol, and sending a keep-alive packet to the ICE mechanism supporting device according to the received keep-alive packet type and/or the keep-alive packet sending period; or
   receiving, by the first MGW, an indication of sending the keep-alive packet, wherein the indication is sent by the first MGC through the extended H.248 protocol; and sending the keep-alive packet to the ICE mechanism supporting device according to the indication of sending the keep-alive packet; or
   answering, by the first MGW, the keep-alive packet sent by the ICE mechanism supporting device.

2. The method of claim 1, wherein the first MGW obtains the information about the local candidate and the candidate of the ICE mechanism supporting device of the peer end, and sends the information about the local candidate to the ICE mechanism supporting device of the peer end in the following way:
   the first MGW obtains the information about the local candidate, interacts with the ICE mechanism supporting device of the peer end through a first Media Gateway Controller, MGC, sends the information about the local candidate to the ICE mechanism supporting device, and obtains the information about the candidate of the ICE mechanism supporting device.

3. The method of claim 1, wherein before the first MGW obtains the information about the local candidate, the method further comprises:
   receiving, by the first MGW, an indication of gathering candidates sent by a first Media Gateway Controller, MGC, through a Session Description Protocol, SDP, and obtaining the information about the local candidate according to the indication of gathering the candidates.

4. The method of claim 1, wherein before the connectivity check, the method further comprises:

receiving, by the first MGW, an indication of initiating connectivity check from a first Media Gateway Controller, MGC.

5. The method of claim 1, wherein before the connectivity check, the method further comprises:

receiving, by the first MGW, indication information which is sent by a first Media Gateway Controller, MGC, through an extended H.248 protocol and indicates whether the first MGW is a controlling role, and     assuming the controlling role or a controlled role in the subsequent connectivity check according to the indication information.

6. The method of claim 1, wherein before the connectivity check, the method further comprises:

receiving, by the first MGW, indication information which is sent by a first Media Gateway Controller, MGC, through an extended H.248 protocol and indicates whether the first MGW is a session originator, and     calculating priority of a candidate pair in the subsequent connectivity check according to the indication information, wherein the candidate pair is generated according to the information about the local candidate and the candidate of the peer end.

7. The method of claim 1, wherein after the connectivity check, the method further comprises: reporting, by the first MGW, a result of the connectivity check to a first Media Gateway Controller, MGC, in the following way:

the first MGW reports the result of the connectivity check to the first MGC through an event based on an extended H.248 protocol, or through an answer to an H.248 request message.

8. The method of claim 7, wherein the result of the connectivity check carries check result information of each candidate pair, and comprises:

stream ID, group ID, local foundation number, foundation number of the peer end, component-id, reflexive type of the peer end, peer reflexive IP address and port, and information about whether the candidate pair is selected, or any combination thereof.

9. The method of claim 1, wherein:

the candidate information is host candidate information, server reflexive candidate information, relayed candidate information, or peer reflexive candidate information, or any combination thereof.

10. A system for implementing Network Address Translation, NAT, traversal, comprising:

a first Media Gateway, MGW, adapted to: obtain information about a local candidate and a candidate of an Interactive Connectivity Establishment, ICE, mechanism supporting device of a peer end, perform connectivity check with the ICE mechanism supporting device of the peer end according to the candidate information, and transmit media streams to and from the ICE mechanism of the peer end supporting device according to a result of the connectivity check;

the ICE mechanism supporting device of the peer end, adapted to: obtain information about the candidate of the peer end and the candidate of the first MGW, perform connectivity check with the first MGW according to the candidate information, and transmit media streams to and from the first MGW according to a result of the connectivity check; and     a first Media Gateway Controller, MGC, adapted to: control the first MGW to obtain the information about the local candidate, perform signaling interaction with the ICE mechanism supporting device to obtain information about the candidate of the ICE mechanism supporting device, send the candidate information to the first MGW, and send information about the candidate of the first MGW to the ICE mechanism supporting device;

wherein the first MGC is further adapted to send to the first MGW an indication of sending a keep-alive packet; and     the first MGW is further adapted to: receive the indication of sending keep-alive packet from the first MGC, and send the keep-alive packet to the ICE mechanism supporting device after receiving the indication.

11. The system of claim 10, wherein the ICE mechanism supporting device is: a second MGW controlled by the first MGC, or a combination of the second MGW and a second MGC, or a Session Initiation Protocol, SIP, agent.

* * * * *